Oct. 25, 1960  A. C. ROSS  2,957,693
ELECTRICAL ROBOT DUELER

Filed Dec. 3, 1956  4 Sheets-Sheet 1

INVENTOR.
ARTHUR C. ROSS
BY *William E. Kinnear*

ATTORNEY

Oct. 25, 1960      A. C. ROSS      2,957,693

ELECTRICAL ROBOT DUELER

Filed Dec. 3, 1956      4 Sheets-Sheet 2

INVENTOR.
ARTHUR C. ROSS
BY William E. Kinnear

ATTORNEY

FIG. 8.

INVENTOR.
ARTHUR C. ROSS
BY William E. Kinnear
ATTORNEY

United States Patent Office 2,957,693
Patented Oct. 25, 1960

2,957,693
ELECTRICAL ROBOT DUELER

Arthur C. Ross, Orange, Tex.
(2216 Healey Drive, Dallas 28, Tex.)

Filed Dec. 3, 1956, Ser. No. 625,674

16 Claims. (Cl. 273—95)

This invention relates to new and useful improvements in a mechanical robot, preferably dressed in cowboy or gangster attire, which is operated electrically and is adapted to be used as an adversary simulating firing live ammunition in drawing and firing a weapon or pistol in a duelling contest with a person competing as a contestant firing live ammunition against the robot.

An object of the invention is to provide an electrically operated mechanical robot simulating a dueler simulating use of live ammunition, which robot is actuated in timed sequences of indicating when the contest starts, drawing a weapon or pistol, and simulating firing of the weapon or pistol by the robot at the contesting person trying to defeat the robot in the timed duel contest.

Another object of the invention is to provide a robot of the character described whereby the parts of the robot are so constructed and arranged that the bullet or projectile fired from contestant's weapon or pistol upon hitting the robot in advance of the firing of its weapon or pistol, will, prevent the robot from continuing through its normal prearranged timed sequences after the beginning of the contest.

A further object of the invention is to provide a robot of the character described whose several movements may be interrupted by the dexterity and skill of the contestant in drawing and firing his weapon and hitting the robot dueler with a bullet or projectile therefrom before the robot can draw and fire its weapon, and, electrically controlled elements or parts of the robot adapted to give audible or visible indications that the contest has been won or lost by the robot.

A still further object of the invention is to provide a robot of the character described having electrically operated means to indicate when the dueler has won or lost the duelling contest, and providing means to be manually operated to actuate the dueler to its normal position ready for another duel contest after the previous contest has been determined.

A still further object of the invention is to provide a method of causing an electrically operated mechanical robot to give a signal to indicate the beginning of a timed duel contest between said robot and a contesting person, causing a period of time to elapse within which a contestant may draw and fire a bullet or projectile from a weapon and hit the robot interrupting prearranged timed movements in sequence of the robot before the robot can draw and fire a weapon in time to defeat a contestant in a timed duel, and causing a return of said robot to normal ready position after the duel contest has been determined.

A still further object of the invention is to provide a method of causing an electrically operated mechanical robot to give a signal to indicate the beginning of a timed duel contest between said robot and a contesting person, causing a period of time to elapse within which a contestant may draw and fire a bullet or projectile from a weapon and hit the robot interrupting prearranged timed movements in sequence of the robot before the robot can draw and fire a weapon in time to defeat a contestant in a timed duel, causing the robot to indicate by signals that the robot has won or lost the duel contest, and causing the robot to return to its normal position ready for another duel contest after the contest has been determined.

A still further object of the invention is to provide a method of causing an electrically operated mechanical robot to light up its eyes and/or sound off the buzzer as signals to indicate the beginning of a timed duel contest between said robot and a contesting person, causing a period of time to elapse within which a contestant may draw and fire a bullet or projectile from a weapon and hit the robot interrupting prearranged timed movements in sequence of the robot before the robot can draw and fire a weapon in time to defeat a contestant in a timed duel, causing the robot to simulate firing live ammunition, causing the robot to indicate by audible or visible signals that the robot has won or lost the duel contest, and causing the robot to return to its normal ready position for another duel contest after the contest has been determined.

These and other objects of the invention will in part be obvious and will in part be more fully disclosed in the specifications, the drawings of which show by way of illustration one embodiment of the invention, in which:

Fig. 4 is a fragmentary view in perspective, showing that portion of the back of the stanchion taken on line 4—4 of Fig. 3, which shows a cross support the ends of which are rigidly welded or attached to the inside of the V-shaped shield torso and movable therewith, which cross support is behind the back of the stanchion and carries electrical contact points which are adapted to be moved rearwardly to contact registering contact points on the face of spring fingers normally resting apart therefrom which spring fingers are attached at their other end to a fiber board insulated cross panel rigidly attached to the rear of the back of the stanchion and immediately above the first named cross support, also showing portions of journaled cross arm support with lever arm extending rearwardly therefrom to which is attached a weight with latching mechanism;

Fig. 7 is a view of the robot in elevation connected by electric wiring to automatic electric control panel with arrows indicating path of electric current on all circuits, with motor and gears meshed so as to impart rotation to worm gear thence to the drive shaft carrying 3 cams which fix the time sequences of the movements of the robot, which cams are shown in normal ready position in connection with spring fingers, and, relay contact points for each cam and the spring fingers are shown contacting the outer cam faces near highest points on cams 76 and 101 and midway point contact on cam 110; which are so constructed so that two cycles of operations are completed on each revolution of the cams or one cycle for each 180 degrees or half turn of the cams; also showing time clock with sweep hand (not shown) the face of which is preferably calibrated in hundredths of a second, also showing 2 spring held automatic operated circuit breakers A and B the contact points of both of which are held yieldingly opened or closed by coil springs on each, and, each are energized to open or close respectively by electric current passing through the solenoids of each circuit breakers A and B; also showing a bell which rings when the contestant has scored a hit on the spring held V-shaped shield representing the torso of the robot, and, all of said electrical operated devices are shown attached to the robot by means of electrical wiring to be connected to the automatic control panel and its electrical operated devices;

Referring to the accompanying drawings in which like numerals herein denote like numeraled part therein in the various views, the robot is comprised of an upright stanchion the upper portion of which forms the back 1 attached to two downwardly depending legs 2—2 whose lower terminating ends are anchored to a base plate or plates 3—3 for securing the framework of the robot thus formed so that the other parts of the robot may be mounted thereon as well as to withstand the impact of bullets hitting the robot. The cross braces 5 and 6 are welded to the rear side of back 1 to which the shield support springs 8 are connected. A V-shaped shield 4 which is bullet proof represents the torso of a person which has a horizontal cross brace 7 bolted thereto inside the rear side thereof. The cross braces 5 and 6 being the upper and lower braces respectively are shown of angle iron construction and are positioned and welded on the rear side of back 1 to which the coil springs 8 are attached on one end to the respective cross braces 5 and 6 and the other end of the coil springs 8 are attached to the inside of the rear side of the V-shaped shield 4. The cross brace 7 is the middle brace which extends across the rear side of the V-shaped shield 4 and is so positioned that it does not bear against the rear side of the back 1 but is spaced rearwardly and outwardly therefrom a sufficient distance so that the electrical contact points 9 (three shown) set in the fiber insulating board 10 which is attached parallel to the middle cross brace 7 may register with electrical contact points 11 (three shown) which are inside the lower end faces 12 of spring fingers 13 (three shown) which are attached at their upper ends 14 to an insulated steel cross support 15 which is attached rigidly to the rear side of back 1 just above and parallel with the middle cross brace 7 which carries the fiber board 10 and the contact points 9 set therein. Contact points 9 are connected to electric wire 16, and, contact points 11 are connected to electric wire 17. The upper portion of the V-shaped shield 4 is formed in a relative position of a person's head 18 which has two holes for eyes 19—19 which has two pipes 20—20 attached thereto and diverging outwardly with the rear ends thereof cut away at 21—21 so that the light bulb 22 attached at the top of back 1 will allow light to shine through the two pipes and through the two eyes 19—19 which when lighted, along with starting of clock 71, and along with sound of buzzer 23 are signals to indicate to the contestant that the duel contest has started. A pair of cone shaped coil springs 24—24 are positioned one near the upper end and one near the lower end of the V-shaped shield 4 to act as shock absorbers, the base part of which are fitted into the back 1 and normally in inoperative extended position bear against the central interior rear side of the said V-shaped shield 4 superimposed over a short guide rod. When the shield 4 is struck with a bullet or projectile from a contestant's weapon or pistol firing live ammunition the coil springs 24—24 are compressed by the impact of the bullet or projectile until the resistance of the coil springs 24—24 overcome the impact force of the bullet or projectile at which time the coil springs 24—24 forces the V-shaped shield 4 forwardly to return to its normal inoperative position. Should a contestant using live ammunication draw, fire and hit the V-shaped shield 4 within the interval of time allowed by the timing elements of the robot before the robot draws and fires, and when the bullet of contestant hits the shield it moves rearward by force of the impact of the bullet or projectile hitting the shield will cause the electrical contact points 9 and registering electrical contact points 11 to engage which allows the electric current to pass to the bell circuit which rings the bell 25 instantaneously stopping the running of the clock and all other circuits which are audible and visible signals to indicate that the contestant has won over the dueler in the duel contest.

Figures 1, 2:
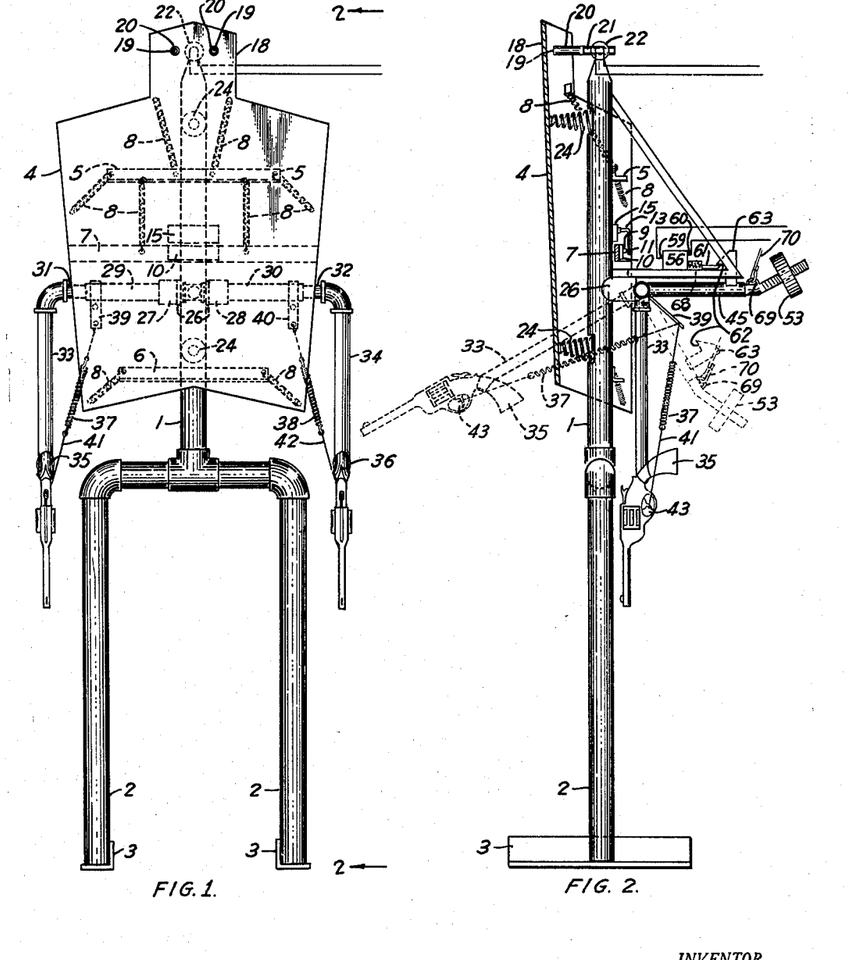
Fig. 1 is a vertical view in elevation of the mechanical robot with pipe connected together forming the framework resembling the back and legs of a man which is a stanchion so-to-speak attached to the floor supporting a spring held V-shaped shield which represents the torso of a man with head attached thereto and having cross arm supports journaled through a sleeve member attached to and mid-way of the back of the stanchion to which is attached depending pipes representing arms the ends of each fitted rigidly to a weapon such as a pistol which are adapted to be fired simulating the use of live ammunition or the like when the dueler is electrically operated to cause the arms to raise to horizontal firing position.
Fig. 2 is a side view in elevation of the mechanical robot turned 90 degrees to Fig. 1, with dotted lines showing the arms and pistols held thereby in approximately a midway position of travel of the arms and pistols in their movement from vertical to horizontal firing position having proceeded to this midway position and having cocked the double action pistol by means of the tension on the coil spring tied intermediate between a string anchored on one end to stationary bracket and the other end tied to the trigger of the double action pistol.
Figures 3, 4, 5:
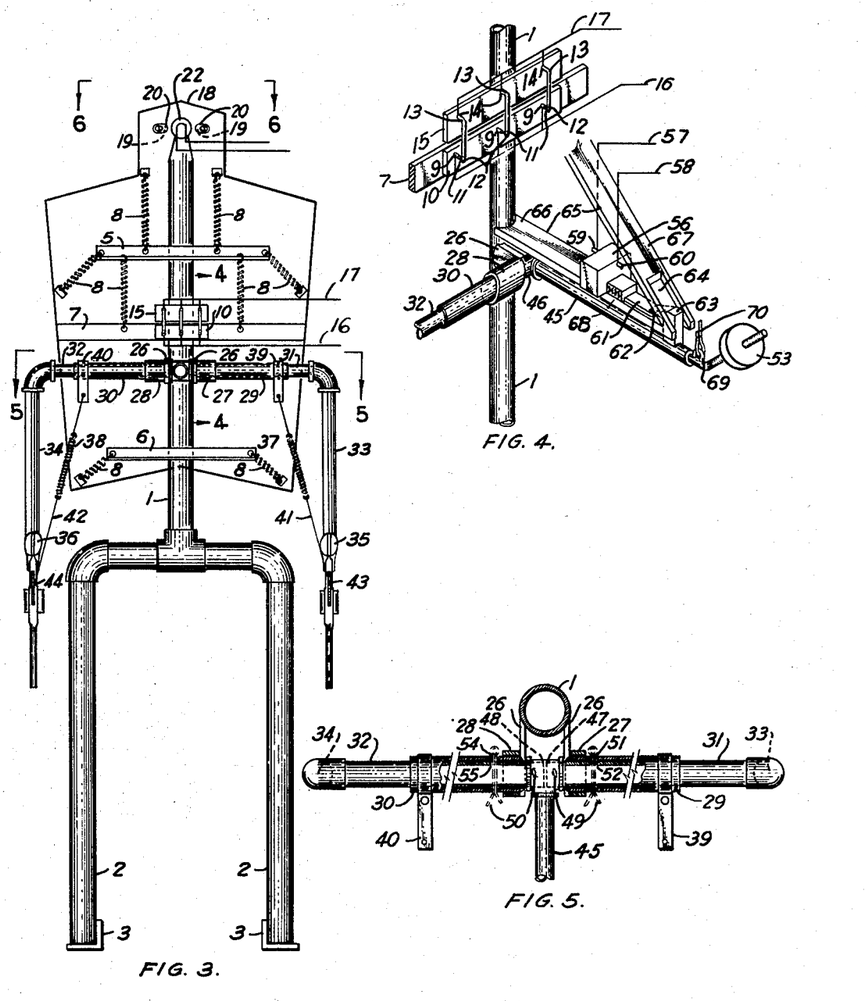
Fig. 3 is a back view in elevation of the mechanical robot turned at 180 degrees to Fig. 1.
Fig. 5 is a detailed top view partly sectional taken on the line 5—5 of Fig. 3, showing two anchor supports rigidly attached around the ends of sleeves which are attached to two collars that are attached rigidly to two strap supports welded to the rear of the back of the stanchion to which anchor supports coil springs are attached with a string leading from each coil spring to the trigger of its respective pistol or weapon, also showing cotter pins inserted through drilled holes through the sleeves and the cross arm supports for fixing either or both of the sleeves to its half cross arm supports so that one or both pistols may be raised from vertical position to horizontal firing position if single or two gun action is desired.
Figure 6:
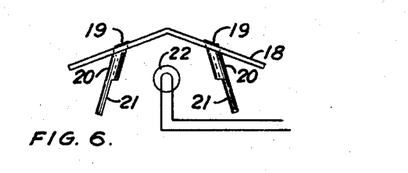
Fig. 6 is a top view of the head above the torso of the robot taken on the line 6—6 of Fig. 3 illustrating the light which when electrically lighted will show through the slanted holes in the head as the signal to indicate to the contestant that the duel contest has begun.

The assembly of the robot dueler which has to do with its movements and action in firing its weapon on pistols to win the duel contest over the contestant if such contestant fails to draw, fire and hit the V-shaped shield 4 of the robot with a bullet or projectile within the pre-arranged interval of time allowed the contestant, is comprised of two strap supports 26—26 welded or affixed to each side of the back 1 and extend parallel and rearwardly thereof a short distance to the rear end of which is welded or affixed exteriorly of each support 26 two short sleeve collars 27 and 28 in matching relationship to form lateral supports through which longer sleeves 29 and 30 may be welded and extend to the inside faces of strap supports 26—26 to form lateral journaled bearing supports through which pipe arms 31 and 32 turn when they are actuated by electric means hereinafter described in moving said pipe arms 31 and 32 from ready position to full operative position and vice versa, that is, so that the respective forearms 33 and 34 of pipe arms 31 and 32 are actuated in a swinging movement from a downward vertical position to an outward horizontal firing position and vice versa. Weapons such as two double-action pistols 35 and 36 are rigidly attached to the lower end of the respective forearms 33 and 34. Coil springs 37 and 38 are attached to rearwardly extending anchor supports 39 and 40 respectively and the other ends of the coil springs 37 and 38 are connected to strings or wires 41 and 42 which strings or wires are tied to the triggers 43 and 44 respectively of the pistols 35 and 36 so that the coil springs 37 and 38 will cock the hammers of each of the pistols 35 and 36 respectively by tension of the trigger pulls on the pistols by the time that the pistols have reached approximately the midway travel from vertical ready positions to extended horizontal firing positions as indicated by the dotted lines in Fig. 2 of the drawings. From the movement of the pistols from the approximate midway positions to extended horizontal firing positions a further tension pull by the coil springs 37 and 38 on the triggers of the respective pistols will cause the hammers of the respective pistols to be released which are activated by usual mechanism of such type pistols in moving forward, striking the cap of the pistol cartridges and firing the blank cartridges of the robot dueler.

A movable lever 45 is attached to 3-way T-pipe connection 46 and normally extends in a rearward horizontal position when in ready position but swings downward to vertical position during the cycle of movement of the forearms 33 and 34 with pistols 35 and 36 simultaneously with swinging movement of the pistols from downward vertical ready position to full operative forward horizontal firing positions.

The lateral ends of the 3-way T 46 fit between the inner ends of the sleeves 29 and 30 and the lateral hole through the T 46 is in register with the holes through sleeves 29 and 30 through which the arms 31 and 32 respectively work and turn which are journaled bearing supports therefor. The inner ends of the arms 31 and 32 extend through lateral hole in T 46 and meet midway of said hole in abutting relationship with free working space between the abutting ends so that one or both arms 31 and 32 may be pinned thereto through matching holes in T 46 with corresponding holes near the inner ends 47 and 48 respectively of the arms 31 and 32 by means of cotter pins 49 and 50 respectively which couples the arms 31 and 32 to the T 46 to which also the lever 45 is attached so that the release of the lever by electrically controlled means hereinafter described will cause the lever to swing downwardly to the vertical position and in so doing will turn the T 46 therewith so that the lateral ends of the T 46 to which the arms 31 and 32 are pinned by cotter pins 49 and 50 respectively will cause the arms 31 and 32 to turn downwardly in a clockwise movement which will cause the forearms 33 and 34 respectively attached to the pipe arms 31 and 32 to move forwardly from downward vertical ready positions in a swinging movement of a forward horizontal firing operative position upon the completion of its full swing from downward vertical position to upward forward horizontal firing position working simultaneously with the downward swinging movement of the lever 45 from its ready rearward horizontal position to its downward vertical full operative position, and vice versa. The respective parts are returned to their normal ready positions ready for a repetition of the actions when the robot dueler is engaged in another contest with a contestant trying beat the robt to the draw and fire and hit the robot dueler before the robot can draw and fire its pistols. One of the arms, forearms and pistol carried thereby may be eliminated from going into action as each is arranged and constructed to act separately by the means of removing one of said cotter pins such as cotter pin 49 from the matching holes through the left side of T 46 and end 47 of arm 31 and insert the cotter pin 49 in the matching holes 51 and 52 through sleeve 29 and arm 31 respectively which will keep arm 31, and forearm 33 and pistol 35 connected thereto from moving while allowing arm 32, forearm 34 and pistol 36 to move simultaneously with the movement of lever 45 and weighted end 53 as the cotter pin 50 is pinned through matching holes in the right end of T 45 and the end 48 of the right arm 32 is coupled together for simultaneous movement of operating the robot dueler with the right pistol only, thus keeping the left arm and pistol secured in a completely arrested inoperative position and will further prevent it from dangling or bouncing up or down from the action of the lever 45 and the right arm and pistol which are free thus arranged to draw, fire and return to its ready vertical position for successive engagements with a contestant. Should the operator desire the right arm can likewise be rendered completely inoperative and the left arm and pistol free to operate with the action of the lever 45 by removing the cotter pin 50 from the matching holes through the right side of the T 46 and end 48 of the arm 32 and place the cotter pin 50 through matching holes 54 and 55 through the sleeve 30 and the arm 32 respectively which renders arm 32 and forearm 34 and pistol 36 in complete arrested inoperative position but yet permits arm 31, forearm 33 and pistol 35 free movement simultaneously with lever 45. Thus it will be seen that the robot dueler is so constructed and may be arranged whereby either one or both of the pistols may be employed by the robot dueler in a duelling contest with a contestant.

The lever 45 acts in response to releasing of the lever arm by means of electric current passing through the automatic control panel at a prearranged timed interval for operating the solenoid 56 with the electric current through electric wires 57 and 58 attached to points 59 and 60 respectively of the solenoid which operates the spring held trigger 61 which when released by a withdrawing action unlatches it by disengaging itself from the under side face 62 of catch 63, which clears and works through slot 64 notched out of the outer ends of horizontal portion 66 and angled portion 67 of triangular brace 65. The inner ends of said horizontal portion 66 and angled portion 67 of said brace 65 being welded to the rear side of back 1 as a hanger and support for lever arm 45, as well as, said brace 65 providing a mounting for the solenoid 56 with its engaging and disengaging trigger 61 for catching and holding the catch 63 which is attached to the top side of lever 45 and for releasing said catch 63 to allow the lever 45 and weight 53 to fall downwardly to turn the arms 31 and 32, and thereby swing the forearms 33 and 34 and pistols 35 and 36 in operating the robot dueler to operative horizontal firing position, and conversely the catch 63 is latched in ready position by engaging the reciprocating springs held trigger 61 which normally is held extended by spring 68 attached to the solenoid 56 when the lever 45 is returned to its ready horizontal position for another duel contest with a contestant. The lever 45 may be returned to its horizontal ready position by manually pulling on a rope 70 attached to eyelet 69 and threaded over a pulley (not shown) for easily lifting the lever 45 back into ready horizontal position and causing the trigger 61 to engage the catch 63 or this may be accomplished by electrically operated means if so desired.

Thus having described the mechanical functions of the robot dueler, the functions and workings of the electrical parts and their functions as they relate to the movements and actions of the robot dueler will hereinafter be described.

Figure 7:
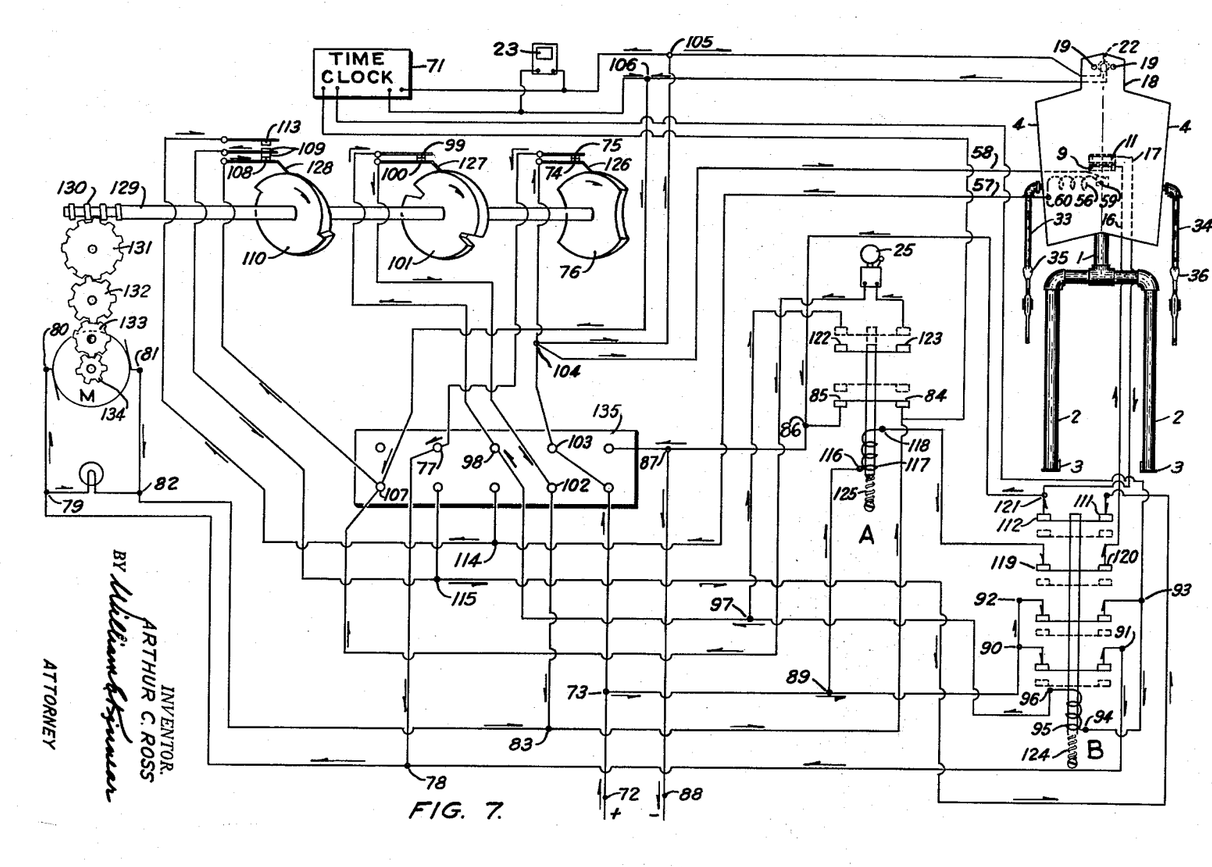

In the first action of the robot as operated by the electric current passing through the automatic control planel generally indicated at 135 and as shown in Fig. 7, of the drawings, the contest is begun by closing the points of circuit breaker B by manually pushing button B giving the dueler, who is in a standing position facing the contestant, by the eyes 19—19 of the robot dueler lighting up by glowing signal light 22, the buzzer 23 sounding off and the time clock 71 starting to register the time interval within which the contestant has to draw his weapon, fire and hit the V-shaped shield 4 within the prearranged alloted time interval before the robot can go into action of raising its pistols 35 and 36, or either of them as made and provided, and complete its sequence of action of firing its pistols and winning the contest, should the contestant fail to draw, fire and hit the bullet shield 4 of the robot dueler with a bullet or projectile from the weapon or pistol of the contestant within the prescribed time interval. The electric current passing through wires from connection 105 simultaneously flows to signal light 22 in one direction to give visible signal that timed duel contest has begun and in the other direction to energize the buzzer 23 making it give audible sound, and to set the prearranged time interval in the clock, for example one and one-quarter seconds, and said electric current returns through connection point 106 to complete this phase of the circuit. Also when push button B is engaged and the contact points of circuit breaker B make contact, electric current flows through wires connecting points 72, 73, and 89, thence through contact points 90, 92 and 93 and thence through wire from contact point 93 to time clock device to energize timer motor (not shown) thereof in the usual manner to a timer motor in a time clock device which starts the running of the clock and causing the pointer hand (not shown) of the usual time clock device to release the pointer hand and start the time running so that pointer hand starts moving to measure the prearranged time interval within which the contestant has to draw and fire his projectile firing weapon and hit the V-shaped shield 4 of the robot dueler, which represents the torso of a person, before the robot dueler is electrically actuated to simulate drawing and firing its weapon. Upon closing of the circuit breaker B manually as indicated, electric current commences to flow from point 72 which is the positive terminal through which the electric current flows from the source and thence the elec-current flows through connections 73, through contact points 74 and 75 at cam 76, through connections 77, 78 and 79, across pilot light to connection 82 as well as connection 79 and thence through connection 80 and thence through commutator motor M to start the motor M which turns the cams to actuate contact points by electric spring contact fingers 126, 127 and 128 for energizing the respective circuits serviced by each, thence through connections 81, 82, and 83, thence through circuit breaker points 84, 85, thence through connections 86, 87 and 88 to the negative side of the line. Also current flows through another circuit from connection 73, thence through connection 89, thence through circuit breaker points 90 and 91 back across to connection 78. Also current flows through another circuit from connection 90, thence through circuit breaker points 92 and 93 and connection 94 through solenoid 95 of circuit breaker B, thence through connections 96, 97 and 98, thence through contact points 99 and 100 at cam 101, thence through connection 102 which reconnects at connections 83, thence through circuit breaker points 84 and 85, thence through connections 86, 87 and 88 to the negative side of the line. Also current flows through another circuit from connections 72, 73, 103, 104 and 105 through signal light 22, clock 71, buzzer 23, thence through connections 106 and 107, thence through contact points 108 and 109 at cam 110, thence returns to circuit breaker points 111 and 112, thence through connections 121, 86, 87 and 88 which is back through the negative side of the line.

The arrows in Fig. 8 indicate the path of the electric current through the respective control circuits affected as follows when the dueler wins the duel contest, that is, when the cam 110 has rotated to a point which closes contact points 113, 109 and 108.

It should be noted that contact points 108 and 109 were already closed before cam 110 has rotated enough to raise electric spring finger 128 high enough to force contact points 108 and 109 further upwardly to close contact point 109 on contact point 113 making all contact points at cam 110 closed, allowing current to flow through connection 104, thence through release solenoid 56 which sets up a magnetic field to withdraw spring held trigger 61 to unlatch the catch 63 and allow lever 45 to swing downward with weight 53 to turn T 46 which will turn pipe arms 31 and 32 to raise forearms 33 and 34 respectively to operative horizontal firing position. Also simultaneously current flows through connection 104, wire 58, connection 59, thence through arm release solenoid 56, connection 60, wire 57 through connection 114, thence through contact points 113 and 109, thence through connection 115, circuit breaker points 111 and 112, and, thence through connections 121, 86, 87 and 88 which is back through the negative side of the line. At this instant all circuits are energized, except the bullet shield relay circuit through relay contact points 11 and 9, and, the bell circuit and the solenoid 117 at circuit breaker A. The above condition of the circuits obtain when the dueler has won the contest over the contestant who has failed to draw, fire and hit the bullet shield 4 which would close bullet shield relay points 9 and 11 within the prearranged time interval from the beginning of the contest before the robot goes into action induced by the devices motivated by the electric current in sequence to cause the robot to draw and fire its weapon after the elapse of the time interval for the contestant to draw, fire and hit the bullet shield 4.

Figure 8:
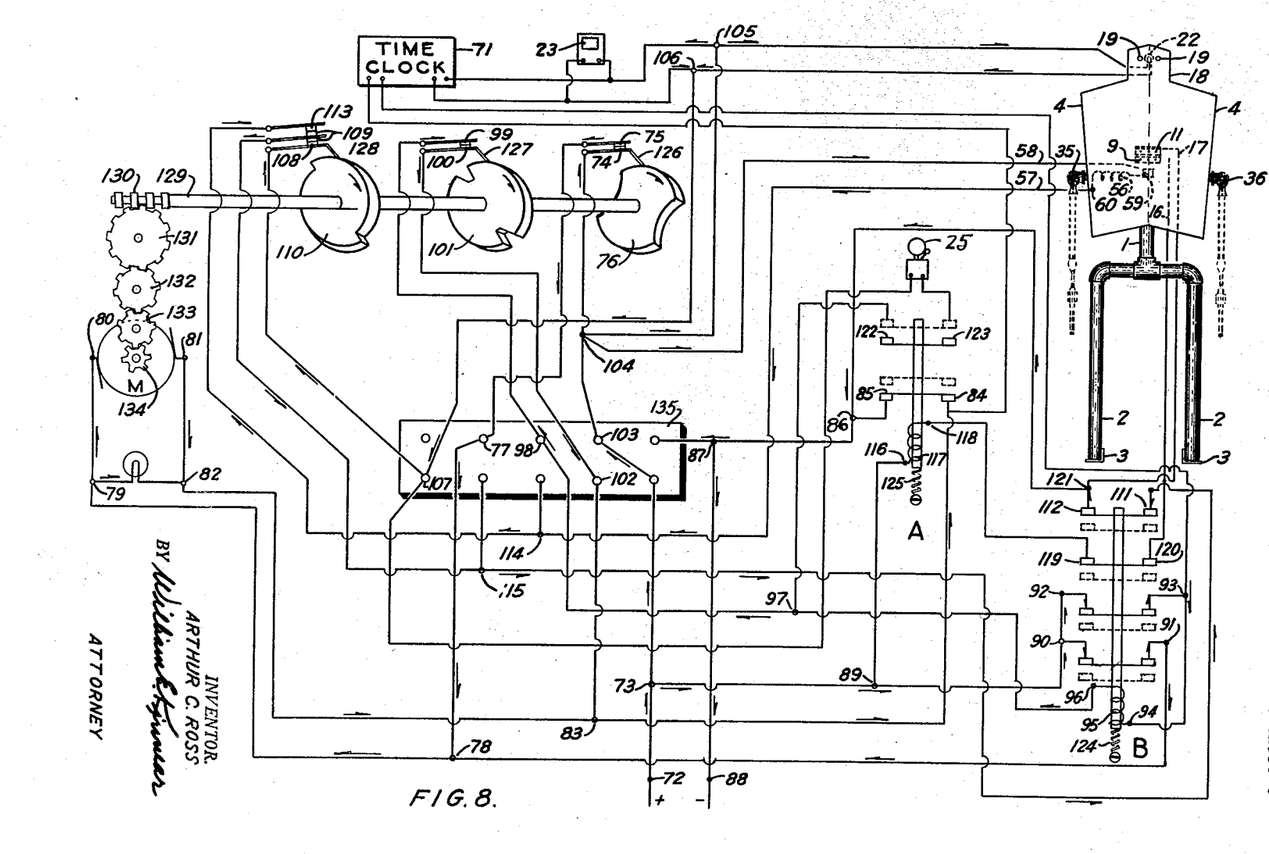
Fig. 8 is a view of the robot in elevation having fired its weapons and is shown connected by electric wiring to electric automatic control panel with arrows indicating path of electric current on all circuits and showing the cams in position indicating that the robot has won the dual contest.

The following description will show how the automatic control panel indicated generally as 135 but includes all of the electrical elements and devices shown in Figs. 7 and 8 of the drawings, but does not include that part of the robot in Figs. 7 and 8 of the drawings indicated by numerals 1, 2, 3, 4, 18, 19, 22, 33, 34, 35 and 36, which automatic control panel 135 starts and stops electric current to all circuits which places the electrical operated devices thereby in operative or inoperative position, but which is ready for a repetition of the beginning of another duel contest by manually pushing in push button B which closes the contact points of circuit breaker B.

Cam 101 has been rotated by cam shaft 129 imparted by commutator motor M through gears 130, 131, 132, 133 and 134 and has progressed to a position opening contact points 99 and 100. When contact points 99 and 100 have opened, this opens the circuit through connections 96 and 94 through solenoid 95 disconnecting the current to solenoid 95 which causes circuit breaker B to spring open by releasing action releasing spring 124 thereof, this action disconnects all circuits except through contact points 74 and 75 and cam 76, since cam 76 has rotated to raise electric spring steel contact finger 126 sufficiently to engage contact points 74 with 75 which causes the current to flow through connections 77, 78 and 79 across pilot light to 82 and also from connection 79 to connection 80 through commutator motor M and thence through connections 81, 82 and 83 through circuit breaker 84 and 85 and thence through connections 86, 87 and 88 back through the negative side of the line. When cam 76 has rotated to a position which causes electric steel contact finger 126 to open contact points 74 and 75 this will stop the current to the motor and will stop commutator motor M, leaving cams 110, 101 and 76 in the proper rotated position with respect to their respective electric steel contact fingers 126, 127 and 128 ready to commence a new sequence of operation all over again upon closing the circuit breaker points of circuit breaker B by manually pushing in push button B which is so designated to associate it with circuit breaker B.

The arrows in Fig. 7 indicate the path of the electric current through the respective control circuits affected as follows when the dueler loses the duel contest. The contest is begun by closing circuit breaker points of circuit breaker B by manually pushing in push button B compressing spring 124 and locking it in compressed position, as the circuit breaker points in circuit breaker B are normally held apart by spring 124, while the circuit breaker points 84 and 85 of circuit breaker A are in normal closed position by spring 125, while circuit breaker points 122 and 123 of circuit breaker A are in opposed positions thereto and normally remain in opened position.

Since circuit breaker points 84 and 85 at circuit breaker A are closed, as well as, contact points 74 and 75 at cam 76, contact points 99 and 100 at cam 101, contact points 108 and 109 at cam 110 due to the relationship of the respective positions of the electric steel spring contact fingers 126, 127 and 128 on the peripherial surfaces of their respective cams 76, 101 and 110, this condition of the affected circuits allows signal light 22 to glow, lighting up eyes 19—19, buzzer 23 to sound off, and, clock 71 begins the time interval within which the contestant has to draw, fire and hit the bullet shield 4 to win the contest before the robot dueler goes into action. Contact points 113 and 109 are open at this instant, being normally closed one and one-fourth seconds after light 22 starts to glow. The contestant's bullet or projectile from his weapon or pistol must strike shield 4 closing relay contact points 9 and 11 during such interval of time in order to conclude a victory over the robot dueler. All the circuits are energized except the bell circuit which will cause the bell to ring only when contact relay point 9 and 11 are closed by the contestant drawing, firing and hitting the bullet shield 4 within the time interval allowed which forces the bullet shield 4 rearwardly to cause contact of contact relay points 9 and 11. When the contact relay points 9 and 11 are closed by impact of contestant's bullet hitting shield 4, electric current will automatically be disconnected from all circuits through automatic control panel, except motor circuit at cam 76, and the bell circuit which is instantly energized when contact relay points 9 and 11 contact. The bell circuit is energized, ringing the bell 25 in the following manner, to wit: Electric current flows from connections 72, 73, 89, 116 and thence through solenoid 117, thence through connection 118, thence through circuit breaker B at points 119 and 120, through contact relay points 9 and 11 and thence through connections 121, 86, 87 and 88 back to the negative side of the line. When the path of electric current just described is closed by contestant's bullet or projectile striking the shield 4, closing contact relay points 9 and 11 the current thence going through solenoid 117 will cause circuit breaker A to spring open, opening circuit breaker points 85 and 84 and closing circuit breaker points 122 and 123 which is the contact to energize the bell circuit that rings the bell 25 to signify that the contestant has won the duel. When circuit breaker points 85 and 84 of circuit breaker A spring open it will disconnect the circuit through circuit breaker points 92 and 93 of circuit breaker B disconnecting the electric current through solenoid 95 causing circuit breaker B to spring open by releasing the tension on spring 124 disconnecting all circuits except the motor circuit at cam 76 which operates commutator motor M to reset all circuits and cams in ready position for another duel contest. Circuit breaker B will now remain open by tension of spring 124 until closed again by manual push button B. Contact points 85 and 84 at circuit breaker A will be closed and held closed by tension of spring 125, thereby closing the motor circuit contact points 74 and 75 at cam 76 allowing the commutator motor M to operate and turn the cam 76 until these contact points 74 and 75 are open by reason of the position of the electric steel spring finger 126 resting on the lowest point of the cam 76 which when rotated to this point the motor M stops with all things in readiness for the next duel contest. It will be noted that the same spring action which closed contact points 84 and 85 will have opened bell contact points 123 and 122. Also, the outer cam faces of each cam are of such configuration as to allow two sequences of operations, that is, two duel contests upon the rotation of one revolution of the cams, or, one duel contest for each one-half revolution of the cams since the outer faces of the cams upon which the electric steel spring contact fingers 126, 127 and 128 ride are of two similar halves which permits of this operation.

The cams 76, 101 and 110 are of a material which is a non-conductor of electric current and the electric steel spring contact fingers 126, 127 and 128 carry the respective contact points as shown and make and break contact between said contact point associated with each cam by riding upon the outer peripheral surfaces of the cam during the rotation of the cams by the commutator motor M.

It is obvious that many changes in detail of construction and arrangement of the parts may be made without departing from the spirit and scope of the invention as set forth in the appended claims.

Having thus described the invention, what I claim as new and desire to secure by Letters Patent, is:

1. A mechanical robot dueler having a stanchion to support the working mechanism of the robot and including a back and legs, a shield representing the torso and head of a person, an arm releasably connected to said back and having a weapon attached thereto, said arm when released adapted to swing upwardly in substantially a vertical movement to operative firing position and be retracted and releasably engaged in normal position ready for the beginning of a timed duel contest, said arm adapted to be swung upwardly and fire said weapon simulating drawing and firing in a timed duel contest against a projectile firing weapon used by a live person as the contestant, an electrical control panel having electric wires and other electrical means connected to said robot through which electric current flows until interrupted by said contestant drawing and firing his weapon and hitting said shield with a projectile therefrom within the prearranged time from the beginning of the duel contest between said robot dueler and said contestant, cams simultaneously rotated on a single shaft by means of an electrically operated commutator motor which times and controls the electric circuits.

2. A mechanical robot dueler having a stanchion to support the working mechanism of the robot and including a back and legs, a shield representing the torso and head of a person, an arm releasably connected to said back and having a weapon attached thereto, said arm when released adapted to swing upwardly in substantially a vertical movement to operative firing position and be retracted and releasably engaged in normal position ready for the beginning of a timed duel contest, said arm adapted to be swung upwardly and fire said weapon simulating drawing and firing in a timed duel contest against a projectile firing weapon used by a live person as the contestant, an electrical control panel having electric wires and other electrical means connected to said robot through which electric current flows until interrupted by said contestant drawing and firing his weapon and hitting said shield with a projectile therefrom within the prearranged time from the beginning of the duel contest between said robot dueler and said contestant, cams simultaneously rotated on a single shaft by means of an electrically operated commutator motor, electric steel contact fingers mounted so their lower ends ride on the periphery of the outer edges of said cams in opening and closing electrical contact points thereon during a cycle of operation which times and controls the movements of the robot dueler under conditions simulating a duel with a live person as a contestant.

3. A mechanical robot dueler having a stanchion to support the working mechanism of the robot and including a back and legs, a shield representing the torso and head of a person, an arm releasably connected to said back and having a weapon attached thereto, said arm when released adapted to swing upwardly in substantially a vertical movement to operative firing position and be retracted and releasably engaged in normal position ready for the beginning of a timed duel contest, said arm adapted to be swung upwardly and fire said weapon simulating drawing and firing in a timed duel contest against a projectile firing weapon used by a live person as the contestant, an electrical control panel having electric wires and other means and other electrical means connected to said robot through which electric current flows until interrupted by said contestant drawing and firing his weapon and hitting said shield with a projectile therefrom within the prearranged time from the beginning of the duel contest between said robot dueler and said contestant, cams simultaneously rotated on a single shaft by means of an electrically operated commutator motor, electric steel contact fingers mounted so their lower ends ride on the periphery of the outer edges of said cams in opening and closing electrical control points thereon during a cycle of operation which times and controls the movements of the robot dueler under conditions simulating a duel with a live person as a contestant, said contestant confronting said robot dueler begins the duel contest when a releasable spring controlled circuit breaker is engaged releasably locking said circuit breaker in position engaging all contact points thereof, which instantly causes the electric current to pass through said contact points to give audible signals to the contestant that said timed duel contest has begun.

4. A mechanical robot dueler having a stanchion to support the working mechanism of the robot and including a back and legs, a shield representing the torso and head of a person, an arm releasably connected to said back and having a weapon attached thereto, said arm when released adapted to swing upwardly in substantially a vertical movement to operative firing position and be retracted and releasably engaged in normal position ready for the beginning of a timed duel contest, said arm adapted to be swung upwardly and fire said weapon simulating drawing and firing in a timed duel contest against a projectile firing weapon used by a live person as the contestant, an electrical control panel having electric wires and other means and other electrical means connected to said robot through which electric current flows until interrupted by said contestant drawing and firing his weapon and hitting said shield with a projectile therefrom within the prearranged time from the beginning of the duel contest between said robot dueler, and said contestant, cams simultaneously rotated on a single shaft by means of an electrically operated commutator motor, electric steel contact fingers mounted so their lower ends ride on the periphery of the outer edges of said cams in opening and closing electrical control points thereon during a cycle of operation which times and controls the movements of the robot dueler under conditions simulating a duel with a live person as a contestant, said contestant confronting said robot dueler begins the duel contest when a releasable spring controlled circuit breaker is engaged releasably locking said circuit breaker in position engaging all contact points thereof, which instantly causes the electrical current to pass through said contact points to give visible signals to the contestant that said timed duel contest has begun.

5. A mechanical robot dueler having a stanchion to support the working mechanism of the robot and including a back and legs, a shield representing the torso and head of a person, an arm releasably connected to said back and having a weapon attached thereto, said arm when released adapted to swing upwardly in substantially a vertical movement to operative firing position and be retracted and releasably engaged in normal position ready for the beginning of a timed duel contest, said arm adapted to be swung upwardly and fire said weapon simulating drawing and firing in a timed duel contest against a projectile firing weapon used by a live person as the contestant, an electrical control panel having electric wires and other means and other electrical means connected to said robot through which electric current flows until interrupted by said contestant drawing and firing his weapon and hitting said shield with a projectile therefrom within the prearranged time from the beginning of the duel contest between said robot dueler and said contestant, cams simultaneously rotated on a single shaft by means of an electrically operated commutator motor, electric steel contact fingers mounted so their lower ends ride on the periphery of the outer edges of said cams in opening and closing electrical control points thereon during a cycle of operation which times and controls the movements of the robot dueler under conditions simulating a duel with a live person as a contestant, said contestant confronting said robot dueler begins the duel contest when a releasable spring controlled circuit breaker is engaged releasably locking said circuit breaker in position engaging all contact points thereof, which instantly causes the electric current to pass through said contact points to give visible signals to the contestant that said timed duel contest has begun, and also causes electric current to pass through circuit actuating electric motor to begin turning cam shaft connected to said motor on which is mounted said cams for timing the closing of points on said electric steel contact fingers for energizing the respective circuits to which said points are attached.

6. A mechanical robot dueler having a stanchion to support the working mechanism of the robot and including a back and legs, a shield representing the torso and head of a person, an arm releasably connected to said back and having a weapon attached thereto, said arm when released adapted to swing upwardly in substantially a vertical movement to operative firing position and be retracted and releasably engaged in normal position ready for the beginning of a timed duel contest, said arm adapted to be swung upwardly and fire said weapon simulating drawing and firing in a timed duel contest against a projectile firing weapon used by a live person as the contestant, an electrical control panel having electric wires and other means and other electrical means connected to said robot through which electric current flows until interrupted by said contestant drawing and firing his weapon and hitting said shield with a projectile therefrom within the prearranged time from the beginning of the duel contest between said robot dueler and said contestant, cams simultaneously rotated on a single shaft by means of an electrically operated commutator motor, electric steel contact fingers mounted so their lower ends ride on the periphery of the outer edges of said cams in opening and closing electrical control points thereon during a cycle of operation which times and controls the movements of the robot dueler under conditions simulating a duel with a live person as a contestant, said contestant confronting said robot dueler begins the duel contest when a releasable spring controlled circuit breaker is engaged releasably locking said circuit breaker in position engaging all contact points thereof, which instantly causes the electrical current to pass through said contact points to give visible signals to the contestant that said timed duel contest has begun, and also causes electric current to pass through circuit connected to lights which cast light through eyes of said robot to indicate to the contestant confronting said robot dueler that the duel contest has begun and starts a clock to move for measuring the prearranged time interval which when elapsed another circuit will open which causes a solenoid to be energized to release counter balance means to operate the upward swinging movement of arm and weapon of the robot to operative horizontal firing position should the contestant fail to draw, fire and hit the shield of the robot before the prearranged time interval has elapsed on the clock.

7. A mechanical robot dueler having a stanchion to support the working mechanism of the robot and including a back and legs, a shield representing the torso and head of a person, an arm releasably connected to said back and having a weapon attached thereto, said arm when released adapted to swing upwardly in substantially a vertical movement to operative firing position and be retracted and releasably engaged in normal position ready for the beginning of a timed duel contest, said arm adapted to be swung upwardly and fire said weapon simulating drawing and firing in a timed duel contest against a projectile firing weapon used by a live person as the contestant, an electrical control panel having electric wires and other means and other electrical means connected to said robot through which electric current flows until interrupted by said contestant drawing and firing his weapon and hitting said shield with a projectile therefrom within the prearranged time from the beginning of the duel contest between said robot dueler and said contestant, cams simultaneously rotated on a single shaft by means of an electrically operated commutator motor, electric steel contact fingers mounted so their lower ends ride on the periphery of the outer edges of said cams in opening and closing electrical control points thereon during a cycle of operation which times and controls the movements of the robot dueler under conditions simulating a duel with a live person as a contestant, said contestant confronting said robot dueler begins the duel contest when a releasable spring controlled circuit breaker is engaged releasably locking said circuit breaker in position engaging all contact points thereof, which instantly causes the electrical current to pass through said contact points to give visible signals to the contestant that said timed duel contest has begun, and also causes electric current to pass through circuit connected to an audible signal to indicate to the contestant confronting said robot dueler that the contest has begun and starts a clock to move for measuring the prearranged time interval which when elapsed another circuit will open which causes a solenoid to be energized to release counter balance means to operate the upward swinging movement of arm and weapon of the robot to operative horizontal firing position should the contestant fail to draw, fire and hit the shield of the robot before the prearranged time interval has elapsed on the clock.

8. A mechanical robot dueler having a stanchion to support the working mechanism of the robot and including a back and legs, a shield representing the torso and head of a person, an arm releasably connected to said back and having a weapon attached thereto, said arm when released adapted to swing upwardly in substantially a vertical movement to operative firing position and be retracted and releasably engaged in normal position ready for the beginning of a timed duel contest, said arm adapted to be swung upwardly and fire said weapon simulating drawing and firing in a timed duel contest against a projectile firing weapon used by a live person as the contestant, an electrical control panel having electric wires and other means and other electrical means connected to said robot through which electric current flows until interrupted by said contestant drawing and firing his weapon and hitting said shield with a projectile therefrom within the prearranged time from the beginning of the duel contest between said robot dueler and said contestant, cams simultaneously rotated on a single shaft by means of an electrically operated commutator motor, electric steel contact fingers mounted so their lower ends ride on the periphery of the outer edges of said cams in opening and closing electrical control points thereon during a cycle of operation which times and controls the movements of the robot dueler under conditions simulating a duel with a live person as a contestant, said contestant confronting said robot dueler begins the duel contest when a releasable spring controlled circuit breaker is engaged releasably locking said circuit breaker in position engaging all contact points thereof, which instantly causes the electrical current to pass through said contact points to give visible signals to the contestant that said timed duel contest has begun, and also causes electric current to pass through circuit connected to lights which cast light through eyes of said robot to indicate to the contestant confronting said robot dueler that the duel contest has begun and starts a clock to move for measuring the prearranged time interval which when elapsed another circuit will open which causes a solenoid to be energized to release counter balance means to operate the upward swinging movement of arm and weapon of the robot to operative horizontal firing position should the contestant fail to draw, fire and hit the shield of the robot before the prearranged time interval has elapsed on the clock, and means for making ready said weapon of the robot for firing and other means for firing the weapon of said robot after the elapse of the prearranged time interval on said clock.

9. A mechanical robot dueler having a stanchion to support the working mechanism of the robot and including a back and legs, a shield representing the torso and head of a person, an arm releasably connected to said back and having a weapon attached thereto, said arm when released adapted to swing upwardly in substantially a vertical movement to operative firing position and be retracted and releasably engaged in normal position ready for the beginning of a timed duel contest, said arm adapted to be swung upwardly and fire said weapon simulating drawing and firing in a timed duel contest against a projectile firing weapon used by a live person as the contestant, an electrical control panel having electric wires and other means and other electrical means connected to said robot through which electric current flows until interrupted by said contestant drawing and firing his weapon and hitting said shield with a projectile therefrom within the prearranged time from the beginning of the duel contest between said robot dueler and said contestant, cams simultaneously rotated on a single shaft by means of an electrically operated commutator motor, electric steel contact fingers mounted so their lower ends ride on the periphery of the outer edges of said cams in opening and closing electrical control points thereon during a cycle of operation which times and controls the movements of the robot dueler under conditions simulating a duel with a live person as a contestant, said contestant confronting said robot dueler begins the duel contest when a releasable spring controlled circuit breaker is engaged releasably locking said circuit breaker in position engaging all contact points thereof, which instantly causes the electrical current to pass through said contact points to give visible signals to the contestant that said timed duel contest has begun, and also causes electric current to pass through circuit connected to an audible signal to indicate to the contestant confronting said robot dueler that the contest has begun and starts a clock to move for measuring the prearranged time interval which when elapsed another circuit will open which causes a solenoid to be energized to release counter balance means to operate the upward swinging movement of arm and weapon of the robot to operative horizontal firing position should the contestant fail to draw, fire and hit the shield of the robot before the prearranged time interval has elapsed on the clock, and means for making ready said weapon of the robot for firing and other means for firing the weapon of said robot after the elapse of the prearranged time interval on said clock.

10. An electrically controlled mechanical robot dueler having a stanchion to support the working mechanism of the robot and including back and legs, a shield representing the torso and head of a person, an arm having a weapon attached thereto movably mounted on said robot, said arm connected to means controlled by a counter balance means for swinging said arm and weapon in substantially a vertical movement to operative firing position and for returning said arm and weapon to inoperative position, automatic catch means for releasably holding said counter balance means, arm and weapon releasably connected to means on said stanchion.

11. An electrically controlled mechanical robot dueler having a stanchion to support the working mechanism of the robot and including back and legs, a shield representing the torso and head of a person, an arm having a weapon attached thereto movably mounted on said robot, said arm connected to means controlled by a counter balance means for swinging said arm and weapon in substantially a vertical movement to operative firing position, and for returning said arm and weapon to inoperative position, automatic catch means for releasably holding said counter balance means, means on said stanchion to which said arm is releasably connected for holding said weapon in inoperative position, said arm adapted to be swung upwardly and fire said weapon simulating drawing and firing in a timed duel contest against a projectile firing weapon used by a live person as the contestant, an electrical control panel having electric wires and other electrical means connected to said robot through which electric current flows until interrupted by a contestant drawing and firing his weapon and hitting the shield of said robot dueler with a projectile from said weapon within a prearranged time from the beginning of said duel contest between said robot dueler and said contestant, said electrical control panel includes a circuit breaker and the contact points thereof and a time clock device, said contact points when engaged an electric current flows through said contact points to give visible signal to the contestant that a timed duel contest has begun and said time clock device is electrically actuated upon the beginning of the timed duel contest for measuring the time interval before the robot dueler is electrically actuated to draw and fire upon contestant, and upon projectile from weapon of contestant striking said shield before the elapse of the prearranged time measured by said clock said shield is forced rearwardly.

12. An electrically controlled mechanical robot dueler having a stanchion to support the working mechanism of the robot and including a back and legs, a shield representing the torso and head of a person, an arm having a weapon attached thereto movably mounted on said robot, said arm connected to means controlled by a counter balance means for swinging said arm and weapon in substantially a vertical movement to operative firing position and for returning said arm and weapon to inoperative position, automatic catch means for releasably holding said counter balance means, means on said stanchion to which said arm is releasably connected for holding said weapon in inoperative position, said arm adapted to be swung upwardly and fire said weapon simulating drawing and firing in a timed duel contest against a projectile firing weapon used by a live person as the contestant, an electrical control panel having electric wires and other electrical means connected to said robot through which electric current flows until interrupted by a contestant drawing and firing his weapon and hitting the shield of said robot dueler with a projectile from said weapon within a prearranged time from the beginning of said duel contest between said robot dueler and said contestant, said electrical control panel includes a circuit breaker and the contact points thereof and a time clock device, said contact points when engaged an electric current flows through said contact points to give visible signal to the contestant that a timed duel contest has begun and said time clock device is electrically actuated upon the beginning of the timed duel contest for measuring the time interval before the robot dueler is electrically actuated to draw and fire upon contestant, and upon projectile from weapon of contestant striking said shield before the elapse of the prearranged time measured by said clock said shield is forced rearwardly, electric contact points carried by said shield which when forced rearwardly will contact relay points to close an electric circuit connected to a bell which is energized and rings by electric current flowing through said circuit to indicate that the contestant has won the duel contest.

13. An electrically controlled mechanical robot dueler having a stanchion to support the working mechanism of the robot and including a back and legs, a shield representing the torso and head of a person, an arm having a weapon attached thereto movably mounted on said robot, said arm connected to means controlled by a counter balance means for swinging said arm and weapon in substantially a vertical movement to operative firing position and for returning said arm and weapon to inoperative position, automatic catch means for releasably holding said counter balance means, means on said stanchion to which said arm is releasably connected for holding said weapon in inoperative position, said arm adapted to be swung upwardly and firing in a timed duel contest against a projectile firing weapon used by a live person as the contestant, an electrical control panel having electric wires and other electrical means connected to said robot through which electric current flows until interrupted by a contestant drawing and firing his weapon and hitting the shield of said robot dueler with a projectile from said weapon within a prearranged time from the beginning of said duel contest between said robot dueler and said contestant, said electrical control panel includes a circuit breaker and the contact points thereof and a time clock device, said contact points when engaged an electric current flows through said contact points to give visible signal to the contestant that a timed duel contest has begun and said time clock device is electrically actuated upon the beginning of the timed duel contest for measuring the time interval before the robot dueler is electrically actuated to draw and fire upon contestant, and upon projectile from weapon of contestant striking said shield before the elapse of the prearranged time measured by said clock said shield is forced rearwardly, electric contact points carried by said shield which when forced rearwardly will contact relay points to close an electric circuit connected to a bell which is energized and rings by electric current flowing through said circuit to indicate that the contestant has won the duel contest, at which time electric current will flow through electric wires and through a solenoid connected thereto and cause a spring held circuit breaker connected thereto to spring open which disconnects the electric points thereof to discontinue the ringing of the bell.

14. An electrically controlled mechanical robot dueler having a stanchion to support the working mechanism of the robot and including a back and legs, a shield representing the torso and head of a person, an arm having a weapon attached thereto movably mounted on said robot, said arm connected to means controlled by a counter balance means for swinging said arm and weapon in substantially a vertical movement to operative firing position and for returning said arm and weapon to inoperative position, automatic catch means for releasably holding said counter balance means, means on said stanchion to which said arm is releasably connected for holding said weapon in inoperative position, said arm adapted to be swung upwardly and fire said weapon simulating drawing and firing in a timed duel contest against a projectile firing weapon used by a live person as the contestant, an electrical control panel having electric wires and other electrical means connected to said robot through which electric current flows until interrupted by a contestant drawing and firing his weapon and hitting the shield of said robot dueler with a projectile from said weapon within a prearranged time from the beginning of said duel contest between said robot dueler and said contestant, said electrical control panel includes a circuit breaker and the contact points thereof and a time clock device, said contact points when engaged an electric current flows through said contact points to give visible signal to the contestant that a timed duel contest has begun and said time clock device is electrically actuated upon the beginning of the timed duel contest for measuring the time interval before the robot dueler is electrically actuated to draw and fire upon contestant, and upon projectile from weapon of contestant striking said shield before elapse of the prearranged time measured by said clock said shield is forced rearwardly, electric contact points carried by said shield which when forced rearwardly will contact relay points to close an electric circuit connected to a bell which is energized and rings by electric current flowing through said circuit to indicate that the contestant has won the duel contest, at which time electric current will flow through electric wires and through a solenoid connected thereto and cause a spring held circuit breaker connected thereto to spring open which disconnects the electric points thereof to discontinue the ringing of the bell, and at the same time disconnecting the circuit through a spring held circuit breaker and disconnecting the electric current through a solenoid thereof thereby causing said last named spring held circuit breaker to spring open and thereby disconnecting all circuits except the circuit to a commutator motor.

15. An electrically controlled mechanical robot dueler having a stanchion to support the working mechanism of the robot and including a back and legs, a shield representing the torso and head of a person, an arm having a weapon attached thereto movably mounted on said robot, said arm connected to means controlled by a counter balance means for swinging said arm and weapon in substantially a vertical movement to operative firing position and for returning said arm and weapon to inoperative position, automatic catch means for releasably holding said counter balance means, means on said stanchion to which said arm is releasably connected for holding said weapon in inoperative position, said arm adapted to be swung upwardly and fire said weapon simulating drawing and firing in a timed duel contest against a projectile firing weapon used by a live person as the contestant, an electrical control panel having electric wires and other electrical means connected to said robot through which electric current flows until interrupted by a contestant drawing and firing his weapon and hitting the shield of said robot dueler with a projectile from said weapon within a prearranged time from the beginning of said duel contest between said robot dueler and said contestant, said electrical control panel includes a circuit breaker and the contact points thereof and a time clock device, said contact points when engaged an electric current flows through said contact points to give visible signal to the contestant that a timed duel contest has begun and said time clock device is electrically actuated upon the beginning of the timed duel contest for measuring the time interval before the robot dueler is electrically actuated to draw and fire upon contestant, and upon projectile from weapon of contestant striking said shield before elapse of the prearranged time measured by said clock said shield is forced rearwardly, electric contact points carried by said shield which when forced rearwardly will contact relay points to close an electric circuit connected to a bell which is energized and rings by electric current flowing through said circuit to indicate that the contestant has won the duel contest, at which time electric current will flow through electric wires and through a solenoid connected thereto and cause a spring held circuit breaker connected thereto to spring open which disconnects the electric points thereof to discontinue the ringing of the bell, and at the same time disconnecting the circuit through a spring held circuit breaker and disconnecting the electric current through a solenoid thereof thereby causing said last named spring held circuit breaker to spring open and thereby disconnecting all circuits except the circuit to a commutator motor, said commutator motor adapted to rotate cams carried on a shaft rotated by said motor.

16. An electrically controlled mechanical robot dueler having a stanchion to support the working mechanism of the robot and including a back and legs, a shield representing the torso and head of a person, an arm having a weapon attached thereto movably mounted on said robot, said arm connected to means controlled by a counter balance means for swinging said arm and weapon in substantially a vertical movement to operative firing position and for returning said arm and weapon to inoperative position, automatic catch means for releasably holding said counter balance means, means on said stanchion to which said arm is releasably connected for holding said weapon in inoperative position, said arm adapted to be swung upwardly and fire said weapon simulating drawing and firing in a timed duel contest against a projectile firing weapon used by a live person as the contestant, an electrical control panel having electric wires and other electrical means connected to said robot through which electric current flows until interrupted by a contestant drawing and firing his weapon and hitting the shield of said robot dueler with a projectile from said weapon within a prearranged time from the beginning of said duel contest between said robot dueler and said contestant, said electrical control panel includes a circuit breaker and the contact points thereof and a time clock device, said contact points when engaged an electric current flows through said contact points to give visible signal to the contestant that a timed duel contest has begun and said time clock device is electrically actuated upon the beginning of the timed duel contest for measuring the time interval before the robot dueler is electrically actuated to draw and fire upon contestant, and upon projectile from weapon of contestant striking said shield before the elapse of the prearranged time measured by said clock said shield is forced rearwardly, electric contact points carried by said shield which when forced rearwardly will contact relay points to close an electric circuit connected to a bell which is energized and rings by electric current flowing through said circuit to indicate that the contestant has won the duel contest, at which time electric current will flow through electric wires and through a solenoid connected thereto and cause a spring held circuit breaker connected thereto to spring open which disconnects the electric points thereof to discontinue the ringing of the bell, and at the same time disconnecting the circuit through a spring held circuit breaker and disconnecting the electric current through a solenoid thereof thereby causing said last named spring held circuit breaker to spring open and thereby disconnecting all circuits except the circuit to a commutator motor, said commutator motor adapted to rotate cams carried on a shaft rotated by said motor, at the end of the cycle of a duel contest said motor adapted to reset all electric circuits and cams in ready position for another duel contest.

References Cited in the file of this patent
UNITED STATES PATENTS

| | | |
|---|---|---|
| 2,404,653 | Plebanek | July 23, 1946 |
| 2,580,413 | Dietze | Jan. 1, 1952 |
| 2,710,754 | Varney | June 14, 1955 |